United States Patent Office 3,135,601
Patented June 2, 1964

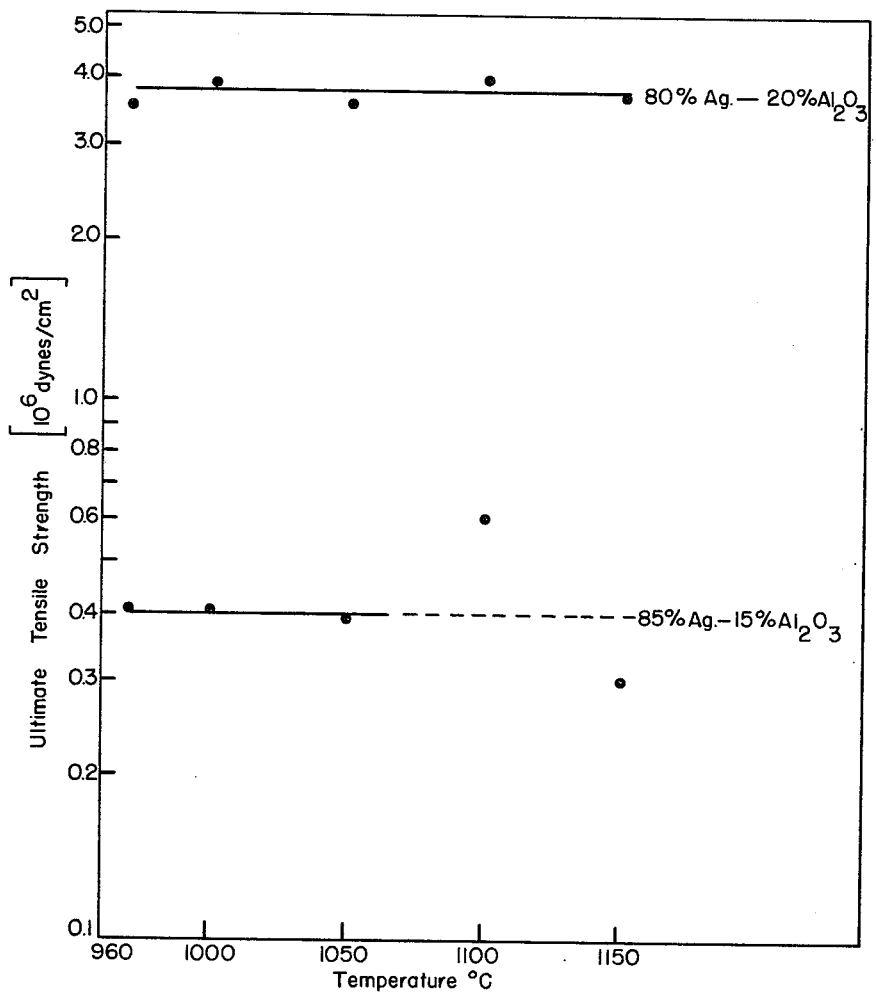
Ultimate Tensile Strength of the 15% and 20% by Weight Alumina in Silver as a Function of Temperature.

3,135,601
ALUMINA-SILVER ALLOY
Howard R. Peiffer, Baltimore, Md., assignor to Martin-Marietta Corporation, Baltimore, Md., a corporation of Maryland
Filed Nov. 16, 1961, Ser. No. 152,788
2 Claims. (Cl. 75—173)

This invention relates to alloys of silver and alumina having high strength, including high tensile strength even above the melting point of silver, which are especially well adapted for brazing, or bonding, metals, cermets and ceramics which may be subject to high temperature applications, and more particularly, to an alloy of silver and alumina containing 15–25% by weight alumina.

United States Patent 2,545,438 discloses spark plug electrodes made of silver containing small amounts of alumina, preferably 0.1–1.0% alumina. The patent teaches the alumina is present to impart hardness and certain resultant characteristics to the electrodes at normal operating temperatures of internal combustion engines which may be up to 800–900° C. The patent teaches the content of alumina should not exceed 1.5% if the highly desirable high heat and electrical conductivity of silver is to be retained without substantial impairment. Although the patent discloses the alumina may be present in amounts up to 10%, it also discloses 3–5% of alumina in the electrodes generally represent a maximum. Moreover silver alloyed with larger amounts of alumina do not possess the workability required in the production of electrodes and the like.

It is an object of this invention to provide a silver-alumina alloy, especially suitable as a bonding material, having high tensile strength at temperatures above the melting point of silver. It is another object of the invention to provide a silver-alumina alloy possessing both ductility and high strength. It is a special object of the invention to provide a bonding, or brazing, alloy especially well adapted for bonding together ceramics, cermets and metals used in high temperature applications. Other objects and features of the invention will become apparent from the disclosure which follows.

The foregoing, and other objectives, of the invention are obtained by providing a silver alloy having a matrix of silver containing 15–25% by weight of alumina dispersed therein, or by providing a uniform, or homogeneous, mixture of finely divided ingredients which are convertible into such an alloy upon being heated to a temperature above the melting point of silver, i.e., 960° C. It has been found that alloys containing less than 15% by weight alumina possess inadequate tensile strength and have too great a tendency to flow and creep to achieve the objectives of the invention while alloys containing more than 25% by weight of alumina take on the characteristics of cermets and their disadvantages, namely, excessive brittleness and lack of ductility. The alloys of this invention possess a very unexpected combination of properties including good thermal shock resistance, good high temperture strength, resistance to creep, good ductility at temperatures below the melting point of silver, and most surprising of all high tensile strength at temperatures both below and above the melting point of silver.

The alloys of this invention, or uniform mixtures from which they are derived, are preferably made by homogeneously mixing very finely divided particles of silver oxide and very finely divided particles of alumina. Generally speaking, the particles should not exceed about one micron in size although particles substantially smaller than one micron in size may have a tendency to agglomerate and thereby make it more difficult to obtain a homogeneous mixture. As a general rule, the particles should be as small and as uniform as possible and yet permit the obtaining of a uniform or homogeneous mixture. Particles of alumina and silver oxide of the desired particle size are readily available commercially.

In accordance with a special embodiment of the invention, silver oxide and alumina in substantially uniform particle sizes not exceeding one micron in proportions suitable for the production of desired alloys are mixed in an ordinary food blender with just enough alcohol to make a slurry. After thorough and homogeneous mixing of the silver oxide and alumina, the slurry is introduced into a suitable container and the alcohol is vaporized off. Then the mixture is gradually heated up to 300–400° C. whereby the silver oxide is at least partially reduced to silver and the oxygen is at least partially absorbed by the silver thereby facilitating the wetting of the alumina. This heated material may then be placed in a suitable die of a desired shape and formed into shaped articles by being subjected to a pressure of 20 t.s.i. It is apparent that free silver is present for the heated uniformly mixed material may be pressed at room temperature while refractories can be pressed at elevated temperatures only. Upon heating a rod, for example, formed in the above noted manner to a temperature above 960° C., an alloy is formed having silver as the matrix and finely divided particles of alumina less than one micron in size as the disperse phase.

On the other hand, after the silver oxide and alumina are homogeneously mixed and heated up to 300–400° C. to thoroughly wet the alumina with the silver, the heated mass could be used as a brazing material to form very strong bonds at temperatures above the melting point of the silver. Also, homogeneous mixtures of very finely divided particles of silver oxide and alumina heated to 300–400° C. could be compressed first into formed bodies to facilitate handling and later disintegrated into a powder for use as a brazing material.

Finely divided particles of silver may be used in place of the silver oxide but under such circumstances the silver should be exposed to the atmosphere, or otherwise aged, sufficiently long to bind enough oxygen to facilitate the wetting of the alumina.

Rectangular rods ¼" by ¼" by 2" containing 20 and 15% alumina were formed in the above noted manner by uniformly mixing respectively 40 grams of alumina with 171.8 grams of silver oxide (to allow for the oxygen content) and 30 grams of alumina with 180.4 grams of silver oxide ($Ag_2O$). Six such rods of each type were subjected to ultimate tensile strength tests at respective temperatures of 970, 1000, 1050, 1100 and 1150° C. in accordance with standard testing procedure with the average results shown in the attached logarithmic chart. It will be observed that at all temperature levels the ultimate tensile strength of the rod containing 20% by weight alumina is about 10 times that of the rods containing 15% by weight alumina. Additionally, the results with the 20% by weight alloy are much more consistent.

Rods made in the same way and containing about 10% alumina and less, have substantially no tensile strength at temperatures above the melting point of silver and showed too great a tendency to flow and creep to obtain the objectives of the invention.

Rods containing 25% by weight alumina also possessed excellent tensile strength and possessed adequate ductility below 960° C. for certain applications. On the other hand, rods containing substantially more than 25% by weight alumina contained areas in which alumina was a continuous phase, or network. Such rods were found too brittle and lacked sufficient ductility to achieve the objectives of the invention. Alloys, or alloyable mixtures, as set out above, containing about 20% by weight alumina were found to possess importantly superior over-all properties in comparison with alloys containing 15 or 25% by weight alumina.

As an indication of the over-all properties of the alloys of this invention, it was found that alumina refractories brazed with the 20% by weight alloys of this invention formed such a strong bond that the alumina broke before the bond broke. The same results were achieved when using beryllia.

An alloy of 20% by weight alumina dispersed in a matrix of silver was quenched from 1200° C. in ice water without cracking or breaking up. This demonstrates the outstanding thermal shock-resistance of an alloy of this invention. As an indication of the high temperature strength of the materials of this invention, it has been found that a rod made of the same alloy may be subjected to prolonged heating in a furnace at 1200° C. without danger of buckling or cracking. In fact, such rods have been suspended between knife edges at 1350° C. for 30 minutes or more, without appreciable buckling. This is nearly 400° C. above the melting point of silver. The good wetting properties, great strength, and the resistance to flow of such alloys, even at high temperatures, and their resistance to thermal shock, make them especially well adapted for joining ceramics and other materials used in high temperature applications.

It will be understood the specific embodiments of this invention have been described purely for illustrative purposes and that modifications thereof and variations therefrom will occur to those skilled in the art without departing from the scope or the spirit of the invention as herein disclosed and defined in the appended claims.

What is claimed is:

1. A silver-alumina alloy consisting essentially of 15–25% by weight of alumina dispersed in a silver matrix.
2. A silver-alumina alloy consisting essentially of about 20% by weight alumina dispersed in a continuous silver phase.

References Cited in the file of this patent

UNITED STATES PATENTS

| | | |
|---|---|---|
| 2,396,101 | Hensel et al. | Mar. 5, 1946 |
| 2,961,416 | Baldrey et al. | Nov. 22, 1960 |

FOREIGN PATENTS

| | | |
|---|---|---|
| 611,813 | Great Britain | Nov. 4, 1948 |
| 542,630 | Canada | June 25, 1957 |